United States Patent [19]

Salice

[11] Patent Number: 5,762,442
[45] Date of Patent: Jun. 9, 1998

[54] CONNECTING METAL FITTING

[75] Inventor: Luciano Salice, Carimate, Italy

[73] Assignee: Arturo Salice S.p.A., Novedrate, Italy

[21] Appl. No.: 670,550

[22] Filed: Jun. 27, 1996

[30] Foreign Application Priority Data

Jun. 28, 1995 [DE] Germany ............ 295 10 504 U

[51] Int. Cl.⁶ ............................................. F16B 12/20
[52] U.S. Cl. ........................ 403/406.1; 16/387; 403/405.1
[58] Field of Search .............................. 16/387, 386, 364, 16/381; 403/230, 231, 245, 240, 256, 405.1, 457.1, 260, 406.1; 411/553

[56] References Cited

U.S. PATENT DOCUMENTS

| | | | |
|---|---|---|---|
| 4,752,150 | 6/1988 | Salice | 403/231 |
| 4,984,926 | 1/1991 | Harley | |
| 5,076,748 | 12/1991 | Waterfield et al. | 411/551 |
| 5,567,081 | 10/1996 | Vallance | 403/231 |

FOREIGN PATENT DOCUMENTS 9302527  4/1993  Germany .
295 04 622 U  5/1995  Germany .

*Primary Examiner*—A. L. Pitts
*Assistant Examiner*—Mark Williams
*Attorney, Agent, or Firm*—Dilworth & Barrese

[57] ABSTRACT

The invention relates to a connecting metal fitting for the detachable connection of furniture parts comprising two cup-shaped housings (1, 3; 42, 43) which can be inserted into and fastened in hollows of two furniture parts (2, 4; 40, 41) which cup-shaped housings (1, 3; 42, 43) are provided in their walls facing each other with boreholes flush in their mounting position and a bolt (14) held in the borehole (25, 26) of the one cup-shaped housing (1, 42) and provided with a radial actuating lever (16) the front peg-shaped end section (15) of which bolt (14) extends over the borehole and can be inserted into the borehole (13) of the other cup-shaped housing (3, 43) and which is provided with tapping thread pitches (18) in such a way that the peg-shaped end section (15) can be interlocked by about a quarter-turn in the borehole (13) of the other cup-shaped housing (3, 43).

20 Claims, 3 Drawing Sheets

U.S. Patent    Jun. 9, 1998    Sheet 1 of 3    5,762,442
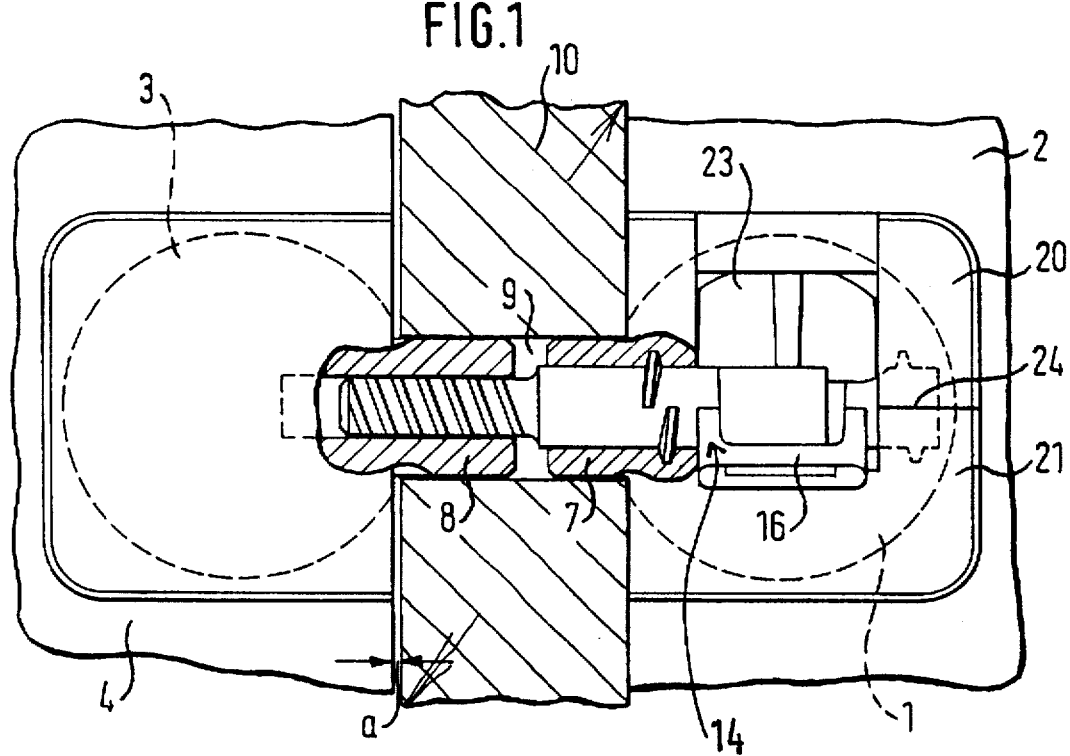
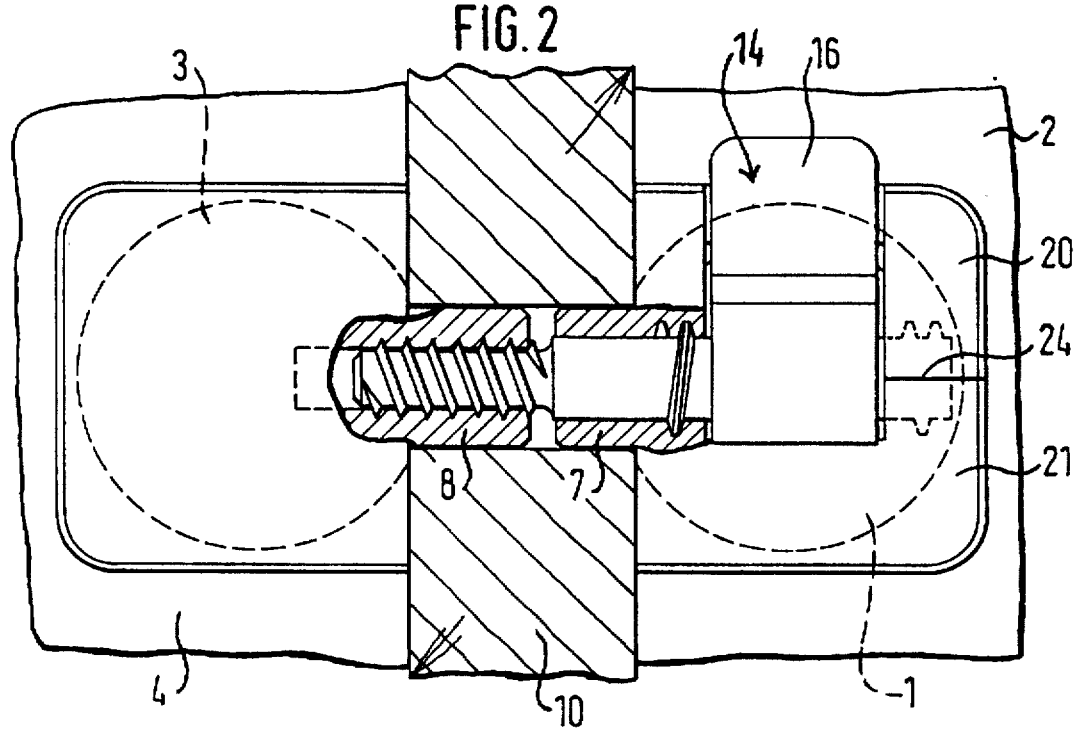

CONNECTING METAL FITTING

CONNECTING METAL FITTING

The invention relates to a connecting metal fitting for the detachable connection of furniture parts.

BACKGROUND OF THE INVENTION

Connecting metal fittings for the detachable connection of furniture parts are known in different design versions. Such connecting metal fittings mostly possess a complicated design. Furthermore, they can always only be mounted with the aid of special tools.

The object of the invention is therefore to create a connecting metal fitting which possesses a simple design and which can be mounted by hand alone in a simple manner without any special tools with essentially no play.

SUMMARY OF THE INVENTION

This object is solved in accordance with the invention by a connecting metal fitting for the detachable connection of furniture parts comprising two cup-shaped housings which can be inserted into and fastened in place in hollows of two furniture parts. Said cup-shaped housings are provided in their walls which face each other with boreholes which are flush in their mounting position. A bolt is held in the borehole of the one cup-shaped housing and provided with a radial actuating lever whose front, peg-shaped end section which extends out of the borehole can be inserted into the borehole of the other cup-shaped housing and which is provided with tapping thread pitches in such a way that the peg-shaped end section can be interlocked in the borehole of the other cup-shaped housing by around a quarter of a turn.

The connecting metal fitting in accordance with the invention is characterized by a particularly simple design. It possesses only one single moving part, namely the bolt pivoted in a cup-shaped housing of the connecting metal fitting which grips in a locking manner to the borehole of the other cup-shaped housing with its front end section. The connecting metal fitting in accordance with the invention can be mounted solely by hand without any additional tool as in order to interlock the two furniture parts only the lever which turns the bolt has to be turned down by hand after the introduction of the bolt's peg-shaped end section provided with tapping thread pitches into the borehole of the other housing. On this turning down the bolt makes a turn which leads to the bolt's peg-shaped end section provided with tapping thread pitches gripping in a form-locking and force-locking manner into the wall of the borehole of the other housing. As the interlocking is performed by self-tapping thread pitches, the furniture parts to be connected are also pulled together in a spanned manner by the turn of the bolt to the interlocking position so that any play which may exist between the furniture parts to be connected can be eliminated.

In accordance with a preferred embodiment it is provided that the boreholes penetrate cylindrical extensions of the housing walls where said cylindrical extensions can be fitted from sides lying opposite each other into a through-hole in a wall where the diameter of said through-hole is adapted to the said cylindrical extensions and where the length of said through-hole is roughly equal to or larger than the sum of the lengths of the extensions. This embodiment allows the simple and fast fastening of boards, bottom boards or plates serving partition purposes to a partitioning wall. In order to fasten the plate-shaped furniture parts to a partitioning wall, said furniture parts are provided at their edge sections with the hollows into which the cup-shaped housings are fitted. Appropriately the extensions are positioned on narrow front sides of the housings whose front sides are flush with the front edges of the furniture boards. This positioning is achieved by the hollows intersecting the front edges of the furniture boards so that the front sides of the housings are positioned in these intersections.

In accordance with a further preferred embodiment it is provided that the cup-shaped housings are inserted and can be directly interlocked together in hollows of two furniture parts to be connected at right-angles. This embodiment allows the connection of bottom boards or partitioning plates to a vertical, end-side furniture wall, for example a side-wall of a cupboard.

Appropriately, only the housing holding the bolt is provided with a cylindrical extension and the other housing with a complementary blind hole to take up the cylindrical extension in the bottom of which said blind hole the borehole ends.

In a further embodiment of the invention it is provided that the bolt's peg-shaped end section provided with a self-tapping thread flattens out on opposite sides and that the borehole of the other housing possesses a rectangular profile essentially adapted to the cone contour profile. As the peg-shaped end section provided with a self-tapping thread is flattened out on opposite sides up to about the area of its core shaft, this end section can be pushed freely up to the stop in the correspondingly profiled borehole of the other housing. By turning down the actuating lever, the bolt is then turned through around a quarter turn so that the parts of the courses of thread which had remained stationary cut into the wall of the borehole of the other part and the cylindrical extensions pull against each other in the manner described.

The radial lever can be formed in one piece (in material homogeneity) with the bolt. The bolt with lever and cone-shaped end section with self-tapping thread are appropriately made of die-cast metal.

The radial lever can be offset.

Appropriately, the housing holding the bolt is provided in its middle section with a hollow penetrating the borehole and open towards the exterior in which hollow the radial lever is positioned. The width of this hollow determines the angle through which the lever can be swivelled between its mounting position and its interlocked position The hollow is appropriately positioned in the middle of the housing so that it interrupts the boreholes located in the opposite housing walls which limit it.

In accordance with a preferred embodiment it is provided that both borehole sections are provided with thread courses for thread pitches of the bolt. This design creates a bolt which in its turn from the mounting position to its interlocked position performs an inward movement into the housing which spans the parts to be connected to each other so that any fairly large play which may exist can be compensated.

Appropriately, the borehole of the rear wall of the housing holding the bolt comprises a blind hole.

A further embodiment of the invention provides that the housing holding the bolt comprises two housing halves whose separation plane runs through the axis of the borehole. The housing halves can be provided on their separation surfaces with cones and boreholes complementary to these so that they can be mounted to the housing by simply pressing them together. This design of the housing allows a simple holding and supporting of the bolt by insertion into the housing halves prior to their connection. The housing and/or the housing halves are appropriately made of plastic injection molded parts.

The actuating lever can be swivelled into a hollow of the housing in its interlocked position so that the top side of the housing and the actuating lever gripping in the hollow are essentially flush. In addition, devices for the holding in place of the actuating lever in its interlocked position can be provided.

BRIEF DESCRIPTION OF THE DRAWINGS

Embodiments of the invention are described in more detail below by means of the drawing in which FIG. 1 shows a top view of a first embodiment of the connecting metal fitting in accordance with the invention to connect two plate-shaped furniture parts to a partition wall provided with a through-hole in a state pushed together, but not yet interlocked, partially in cross-section, FIG. 2 a representation of the fitting corresponding to FIG. 3 in an interlocked state, FIG. 3 a view of the separation planes of the two housing parts which can be joined together to make a cup-shaped housing, FIG. 4 a front view of the cup-shaped housing which accepts the peg-shaped end section of the bolt, FIG. 5 a front view of the two housing parts according to FIG. 3 in their position aligned for the purpose of being joined together, FIG. 6 a top view of the bolt with peg-shaped end section and actuating lever, FIG. 7 a front view of the bolt according to FIG. 6, FIG. 8 a cross-section through a second embodiment of the connecting metal fitting in accordance with the invention to connect two furniture parts at right-angles to each other, and FIG. 9 a top view of the cup-shaped housing to accept the interlocking peg in the direction of the arrow A in FIG. 8.

DESCRIPTION OF THE PREFERRED EMBODIMENTS

Figure 3:
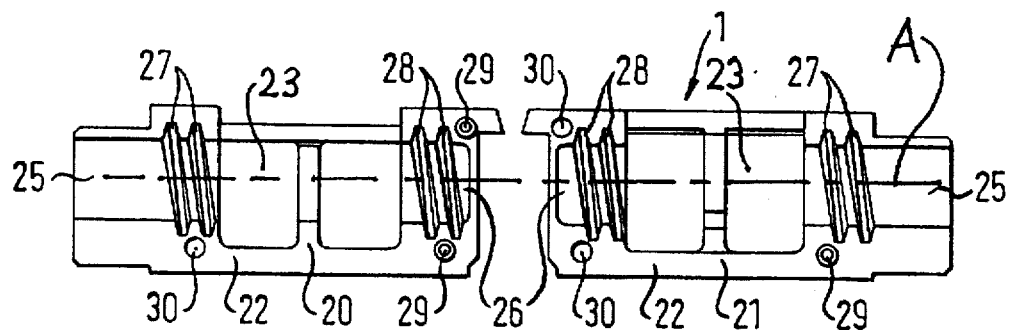

The first embodiment of the connecting metal part in accordance with the invention visible in FIGS. 1 to 7 comprises a first cup-shaped housing 1 which is set into and anchored in a flat, blind hole of a first plate-shaped furniture part 2 as well as a second cup-shaped housing part 3 which is set into a flat-blind hole of a second plate-shaped furniture part 4 in a corresponding manner. The flat, blind holes of the two furniture parts 2, 4 intersect their front, narrow front sides so that aperture gaps are created which are closed by the flattened out front sides 5, 6 of the cup-shaped housings 1, 3. These flattened out front sides 5, 6 of the housings are provided with peg-shaped cylindrical extensions 7, 8 standing perpendicularly on said front sides 5, 6 the diameter of which cylindrical extensions 7, 8 corresponds to a through-hole 9 of a housing wall 10. The cylindrical extensions 7, 8 are provided with axially directed boreholes 12, 13. In borehole 12 a bolt 14 is held which is provided with a front peg-shaped end section 15 provided with a tapping thread and a radial actuating lever 16. The bolt's 14 peg-shaped end section 15 flattened out on opposite sides in the manner visible from FIG. 7 can be pushed in the manner visible from FIG. 1 into the borehole 13 of the second cup-shaped housing with a borehole profile corresponding to the jacket contour of the cone-shaped end section. After the pre-mounting visible from FIG. 1 has been performed by joining together the two cup-shaped housing parts of the connecting metal fitting, the cylindrical extensions 7, 8 of which housing parts grip in the through-hole 9 of the housing wall 10, the cup-shaped housings are interlocked with each other and with the housing wall 10 by the radial actuating lever 16 being swivelled out of its perpendicular position seen in FIG. 1 by 90° into its interlocking position as seen in FIG. 2 at which it grips into a hollow on the top side of the cup-shaped housing 1. During this turning of the bolt 14 through 90°, the self-tapping thread courses 18 which remained stationary after the flattening out of the cone-shaped end section intersect the walls 19 which are parallel to each other of the borehole 13 so that the interlock is generated. The housing 1 is joined together from two housing halves 20, 21 in the manner visible in FIGS. 3 and 5. The housing 1 possesses a middle, essentially rectangular hollow 23 open towards the top and limited towards by a bottom 22 of the housing 1, with said hollow 23 formed between the front wall 5 and a rear wall. The front wall 5 is provided in the way already described in its centre section with a cone-shaped cylindrical extension 7. The housing 1 is provided in its middle plane 24 with a borehole comprising a front borehole section 25 and a rear borehole section 26 closed by a wall. In the borehole sections 25 and 26 in the front and rear parts of the housing 1 two thread courses 27, 28 are worked in the manner shown in FIG. 3. The housing 1 possesses at its separating plane lying in the middle plane 24 cones 29 and correspondingly complementary boreholes 30 so that the housing halves visible in FIG. 3 can be simply joined to form the housing 1 visible in FIGS. 1 and 2.

The shaft part of the bolt 14 held in the housing 1 is provided with two thread pitches 33, 34 which in each case only run around the bolt circumference once and which grip in the joined state of the housing 1 in the thread courses 27, 28.

The hollow 23 of the housing 1 in which the actuating lever 16 is located is limited by side walls.

Figure 4:
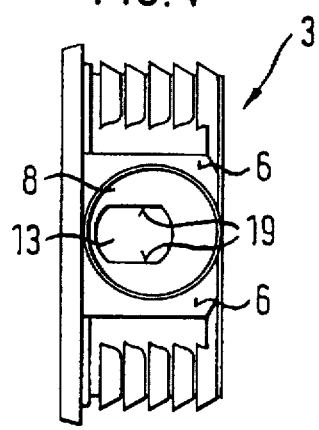
Figure 5:
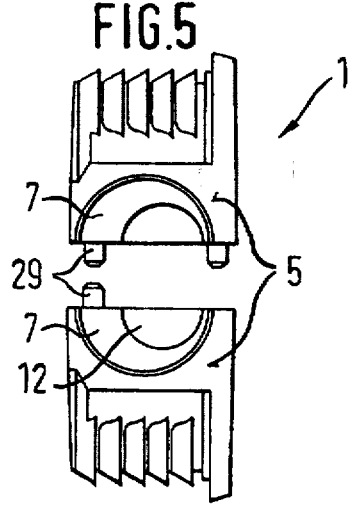
Figure 6:
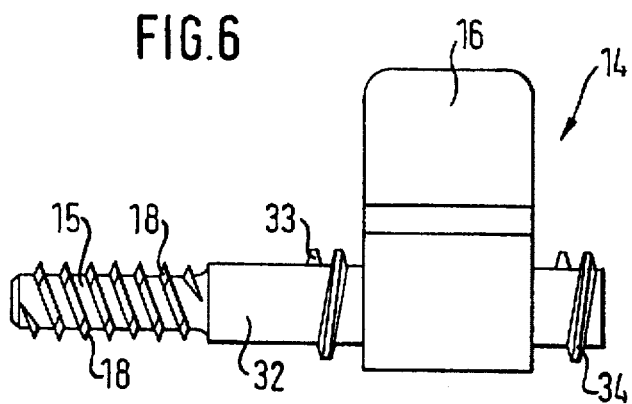
Figure 7:
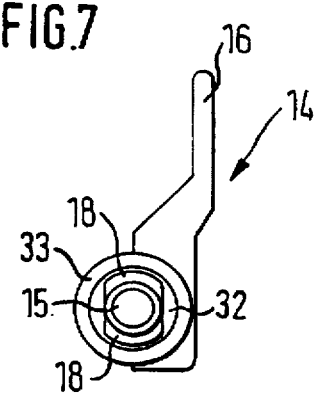

The cup-shaped housings 1, 3 are provided in the manner visible in FIGS. 4 and 5 on their peripheral cylindrical walls with ring-shaped circumferential ribs with sawtooth profiles which serve a holding function.

In the housing 1 the bolt 14 is supported in the manner visible in FIGS. 1- and 2. The bolt 14 comprises a shaft part 32 with the thread pitches 33, 34 which run about only once over its circumference and the peg-shaped end section 15 which extends this forward with flattened out, self-tapping threads 18 on opposite sides. Between the thread pitches 33, 34 the offset actuating lever 16 is connected with the shaft part 32 in one piece.

If after the pushing together of the cup-shaped housings bearing the furniture plates 2, 4 into the pre-mounted position visible in FIG. 1, the actuating lever 16 is placed down through 90° into the position visible in FIG. 2, the thread courses 18 tap in an interlocking manner the wall parts 19 of the borehole 13 of the cup-shaped housing 3. As a result of this tapping the cylindrical extensions 7, 8 are moved towards each other in the through-hole 9. The inward movement of the shaft part 9 is superimposed on this movement with said inward movement being produced by the screwing in of the thread pitches 33, 34 gripping in the thread courses 27, 28. By this pulling together, the gap a still existing in the pre-mounted position visible in FIG. 1 between the plate-shaped part 4 and the housing wall 10 disappears.

The connecting metal fitting in accordance with the invention can be detached in a simple manner by swivelling back the lever from its stopped position visible in FIG. 2 back to its unlocked position visible in FIG. 1.

Figure 8:
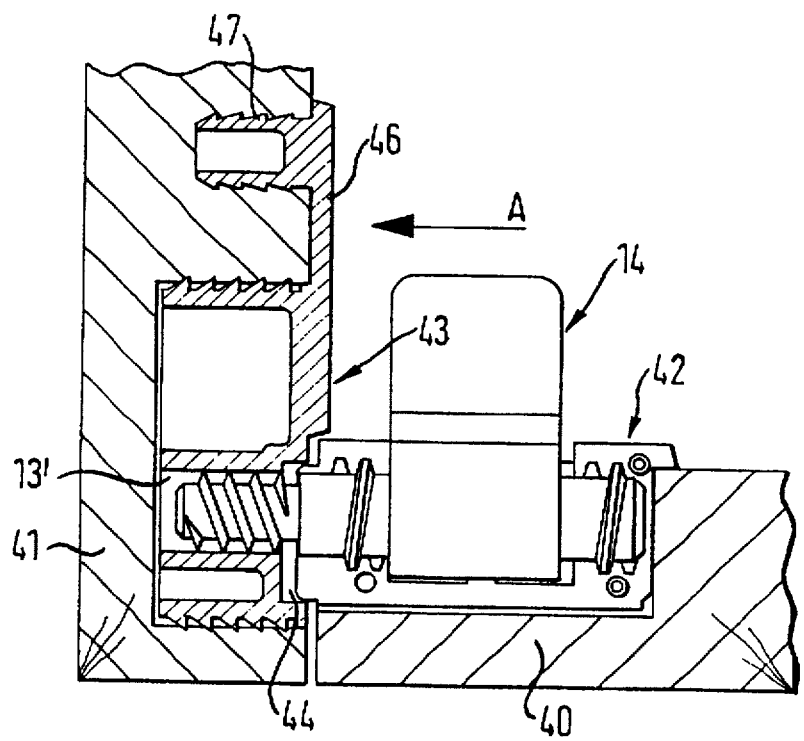
Figure 9:
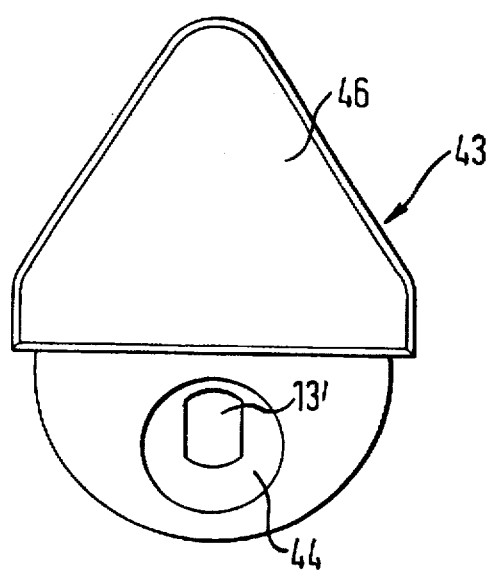

The embodiment in accordance with FIGS. 8 and 9 differs from that in accordance with FIGS. 1 to 7 in that the cup-shaped housings 42, 43 set into the end section of two furniture plates 40, 41 which are to be connected at right-angles to each other are interlocked directly with each other. The connecting metal fitting visible in FIGS. 8 and 9 is therefore, for example, suitable to mount a bottom or a partitioning wall to an end-side wall of a piece of furniture, for example a side wall of a cupboard.

The housing 42 supporting the bolt corresponds to the inclusion of the bolt in principle with the housing 1 and the bolt 14 in accordance with FIGS. 3 and 5 to 7 so that reference is made to the above description for the representation of the housing 42 and the bolt supported in it.

The housing 43 differs from the housing 3 essentially only in that the borehole 13' taking up the bolt with self-tapping thread in the cone-shaped end section is located on the top side of the housing 43 and ends in the bottom of a flat, blind hole 44 whose diameter corresponds to the diameter of the cylindrical extension of the housing 42.

In accordance with the lower depth of the blind hole 44, the cylindrical extension of the housing 42 is also designed correspondingly shorter. However, the possibility exists to give the cylindrical extension 7 of the housing 1 in accordance with the embodiment of FIGS. 1 to 7 such a short design that the cup-shaped housing 1 can be used unchanged also for the mounting and connection with the cup-shaped housing 43.

In all embodiments, the cup-shaped housings are provided with a flange-like edge extending over the flat, blind hole. This flange-like edge 46 is designed in a roughly triangular shape in the cup-shaped housing 3. The triangularly shaped flange 46 bears in the area of its tip an additional dowel-like extension 47 serving the anchoring.

I claim:

1. A connecting metal fitting for the detachable connection of furniture parts comprising
 first and second cup-shaped housings (1, 3; 42, 43) arranged to be inserted into and fastened in hollows of two furniture parts (2, 3; 40, 41) where said cup-shaped housings (1, 3; 42, 43) are provided in walls, which face each other, with respective boreholes (12, 13) therein, and
 a bolt (14) held in the respective borehole (12) of the first cup-shaped housing (1; 42) and provided with a radial actuating lever (16), and a front peg-shaped end section (15) arranged to extend over the same borehole (12) and be inserted into the respective borehole (13) of the second cup-shaped housing (3; 43) and which is provided with tapping thread pitches (18) in such a way that the peg-shaped end section (15) can be interlocked by about a quarter-turn in the borehole (13) of the second cup-shaped housing (3, 43).

2. A connecting metal fitting in accordance with claim 1, characterized in that the boreholes penetrate cylindrical extensions (7, 8) of the housing walls which are arranged to be inserted from opposite sides into a through-hole (9) adapted to their diameters in a wall (10) whose length is roughly equal to or larger than the sum of the lengths of the cylindrical extensions (7, 8).

3. A connecting metal fitting in accordance with claim 2, characterized in that the cylindrical extensions (7, 8) are positioned on narrow, front sides (5, 6) of the housings (1, 3) flush with front edges of furniture boards (2, 4).

4. A connecting metal fitting in accordance with claim 2, characterized in that the peg-shaped end section (15) of the bolt (14) provided with a self-tapping thread (18) is flattened out on opposite sides and the borehole of the second housing (3, 43) possesses a rectangular profile essentially corresponding to the peg contour profile.

5. A connecting metal fitting in accordance with claim 2, characterized in that the radial lever (16) is designed in one piece (in material homogeneity) with the bolt (14).

6. A connecting metal fitting in accordance with claim 2, characterized in that the radial lever (16) is offset.

7. A connecting metal fitting in accordance with claim 2, characterized in that the first housing (1, 42) holding the bolt is provided in its middle section with a hollow (23) open towards the periphery and penetrating the borehole (25, 26) in which the radial actuating lever (16) is situated.

8. (Twice Amended) A connecting metal fitting in accordance with claim 7, characterized in that the hollow (23) interrupts sections (25, 26) of the borehole (12) which are located in opposite walls of the first housing (1; 42), said opposite walls limiting the borehole sections (25, 26).

9. A connecting metal fitting in accordance with claim 2, characterized in that two sections (25, 26) of the borehole (12) are provided with thread courses (27, 28) for thread pitches (33, 34) of the bolt (14).

10. A connecting metal fitting in accordance with claim 1, characterized in that the cup-shaped housings (42, 43) are arranged to be inserted into and directly interlocked with each other in hollows of two furniture parts (40, 41) which are to be joined at right-angles.

11. A connecting metal fitting in accordance with claim 10, characterized in that only the first housing (42) holding the bolt (14) is provided with a cylindrical extension and the second housing (43) is provided with a complementary.

12. A connecting metal fitting in accordance with claim 1 characterized in that the peg-shaped end section (15) of the bolt (14) provided with a self-tapping thread (18) is flattened out on opposite sides and the borehole of the other housing (3, 43) possesses a rectangular profile essentially corresponding to the peg contour profile.

13. A connecting metal fitting in accordance with claim 1, characterized in that the radial lever (16) is designed in one piece (in material homogeneity) with the bolt (14).

14. A connecting metal fitting in accordance with claim 1, characterized in that the radial lever (16) is offset.

15. A connecting metal fitting in accordance with claim 1, characterized in that the first housing (1, 42) holding the bolt is provided in its middle section with a hollow (23) open towards the periphery and penetrating the borehole (25, 26) in which the radial actuating lever (16) is situated.

16. A connecting metal fitting in accordance with claim 15, characterized in that the hollow (23) interrupts sections (25, 26) of the borehole (12) which are located in opposite walls of the first housing (1; 42), said opposite walls limiting the borehole sections (25, 26).

17. A connecting metal fitting in accordance with claim 1, characterized in that two sections (25, 26) of the borehole (12) are provided with thread courses (27, 28) for thread pitches (33, 34) of the bolt (14).

18. A connecting metal fitting in accordance with claim 1, characterized in that the borehole of a rear wall of the first housing (1, 42) is a blind borehole (26).

19. A connecting metal fitting in accordance with claim 1, characteized in that the first housing (1, 42) comprises two housing halves (20, 21) whose separating plane (24) runs through the axis of the bolt (14).

20. A connecting metal fitting in accordance with claim 19, characterized in that the housing halves (20, 21) are provided with cones (29) and complementary boreholes (30) on their separating surfaces.

* * * * *